US010275662B1

(12) United States Patent
Askeland

(10) Patent No.: US 10,275,662 B1
(45) Date of Patent: Apr. 30, 2019

(54) ESTIMATING FRICTION BASED ON IMAGE DATA

(71) Applicant: Zoox, Inc., Menlo Park, CA (US)

(72) Inventor: Jacob Lee Askeland, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 196 days.

(21) Appl. No.: 15/281,416

(22) Filed: Sep. 30, 2016

(51) Int. Cl.
*G06K 9/00* (2006.01)
*H04N 5/247* (2006.01)
*G06T 7/00* (2017.01)
*G06T 7/40* (2017.01)
*G06K 9/52* (2006.01)

(52) U.S. Cl.
CPC .......... *G06K 9/00791* (2013.01); *G06K 9/52* (2013.01); *G06T 7/0042* (2013.01); *G06T 7/0065* (2013.01); *G06T 7/40* (2013.01); *H04N 5/247* (2013.01)

(58) Field of Classification Search
CPC .... G06K 9/00791; G06K 9/52; G06T 7/0042; G06T 7/0065; G06T 7/40; H04N 5/247
See application file for complete search history.

(56) References Cited

U.S. PATENT DOCUMENTS

| | | | | |
|---|---|---|---|---|
| 6,526,804 B2* | 3/2003 | Takahashi | ............... | B60T 8/172 701/80 |
| 6,597,980 B2* | 7/2003 | Kogure | ................... | B60T 8/172 303/160 |
| 9,643,617 B2* | 5/2017 | Fischer | ............... | B60W 40/068 |
| 9,676,331 B2* | 6/2017 | Hartmann | ................. | B60R 1/00 |
| 9,950,707 B2* | 4/2018 | Tan | .................... | B60W 50/0098 |
| 2005/0143889 A1* | 6/2005 | Isaji | ....................... | G08G 1/161 701/70 |
| 2010/0100360 A1* | 4/2010 | Deng | ...................... | B60T 8/172 703/2 |
| 2010/0114431 A1* | 5/2010 | Switkes | .............. | B60T 8/17557 701/41 |
| 2015/0371095 A1* | 12/2015 | Hartmann | .......... | G06K 9/00791 348/148 |
| 2016/0139598 A1* | 5/2016 | Ichikawa | .............. | B60W 30/09 701/25 |
| 2017/0120923 A1* | 5/2017 | Rovik | ............. | B60W 30/18154 |
| 2017/0313310 A1* | 11/2017 | Awan | .................... | B60W 30/12 |

* cited by examiner

*Primary Examiner* — Gregory M Desire
(74) *Attorney, Agent, or Firm* — Lee & Hayes, P.C.

(57) ABSTRACT

A friction estimation system for estimating friction-related data associated with a surface on which a vehicle travels, may include a camera array including a plurality of imagers configured to capture image data associated with a surface on which a vehicle travels. The image data may include light data associated with the surface. The friction estimation system may also include an image interpreter in communication with the camera array and configured to receive the image data from the camera array and determine friction-related data associated with the surface based, at least in part, on the image data. The image interpreter may be configured to be in communication with a vehicle control system and provide the friction-related data to the vehicle control system.

28 Claims, 8 Drawing Sheets

ESTIMATING FRICTION BASED ON IMAGE DATA

BACKGROUND

The performance of a vehicle is limited, in part, by the level of traction between tires of the vehicle and the road surface on which the vehicle travels. All other parameters being equal, with more traction, a vehicle can accelerate, change direction, and stop more quickly. Traction between the tires and the road surface is directly proportional to the friction between the tires and the road surface, which, in turn, is directly proportional to the coefficient of friction between the tires and the road surface. The coefficient of friction is largely a function of characteristics of the material and tread of the tires and characteristics of the road surface, such as, for example, the material and texture of the road surface and any coating on the road surface, such as, for example, dirt, oil, water, snow, or ice.

As a result, the vehicle may lose control during acceleration, steering, and/or braking inputs that result in the vehicle tires losing traction with the road surface, particularly when the road surface has a coating of water, snow, or ice. In addition, for a typical autonomously controlled vehicle, the vehicle has no ability to estimate the friction or level of traction between the tires and the road surface on which the vehicle travels based on the characteristics of the surface. As a result, an autonomously controlled vehicle may attempt maneuvers that require more traction than is available for the given road surface, which may result in the vehicle losing control. Alternatively, the autonomously controlled vehicle may be programmed to make maneuvers at acceleration, turning, and/or braking rates slow enough to ensure that traction limitations are not exceeded, regardless of the level of traction available between the tires and the surface. This may result in an undesirably low level of maneuvering performance, particularly if the vehicle is programmed to operate on road surfaces coated with water, snow, or ice. As a result, an autonomously controlled vehicle programmed to operate in this manner may maneuver at an undesirably slow rate in many conditions.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
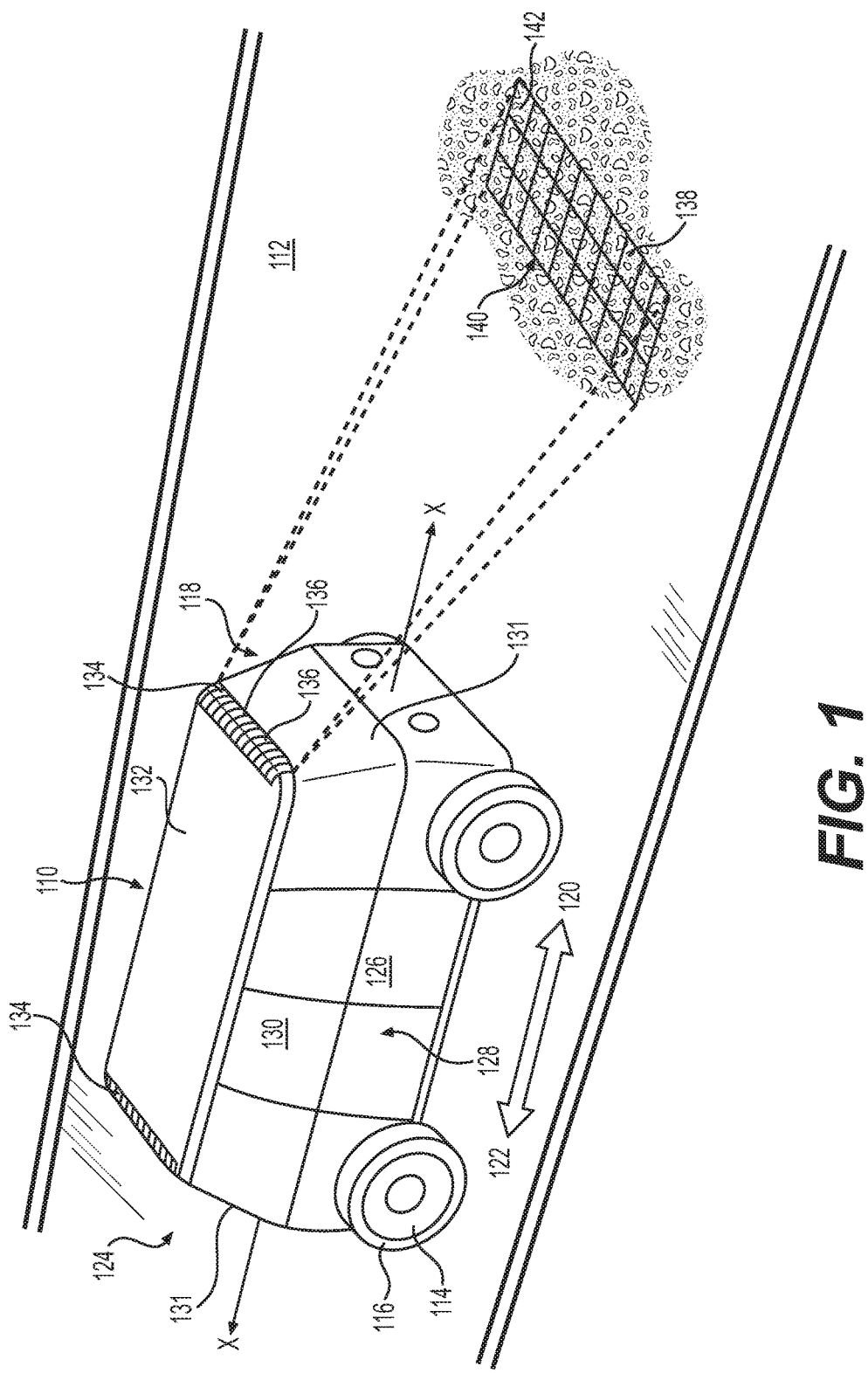
FIG. 1 is a perspective view of an example of a vehicle including an illustrative camera array.

As discussed above, the performance of a vehicle is limited, in part, by the level of traction between tires of the vehicle and the road surface on which the vehicle travels, which is directly proportional to the friction and thus the coefficient of friction between the tires and the road surface. The friction between two surfaces may be either static, when the two surfaces are not moving relative to one another, or kinetic, when the two surfaces are moving or sliding with respect to one another. Sometimes the static and kinetic friction are different from one another, depending on the surfaces. Similarly, the coefficient of friction may be expressed as either static or kinetic, depending on whether the friction related to the coefficient is static or kinetic. For the purpose of this application, unless otherwise stated, the term "friction" applies to both static and kinetic friction, and the term "friction coefficient" applies to both the coefficient of static friction and the coefficient of kinetic friction. The coefficient of friction is largely a function of characteristics of the material and tread of the tires, environmental conditions, such as temperature and humidity, and characteristics of the road surface, such as the material and texture of the road surface and any coating on the road surface, such as, for example, dirt, oil, water, snow, or ice.

Some examples described herein may estimate friction between tires of a vehicle and a surface on which the vehicle travels. Such examples may provide an ability to adjust driving inputs, including acceleration, steering, and/or braking inputs, according to the level of traction provided by the interaction between the tires and the surface, regardless of the inputs. In addition, or alternatively, such examples may provide an ability to adjust suspension settings and/or aerodynamic characteristics of the vehicle, for example, by re-orienting or re-shaping spoilers, wings, cowls, and/or other aerodynamic surfaces of the vehicle. In addition, or alternatively, such examples may enable an autonomously controlled vehicle to control its maneuvering according to the level of traction available from the tires and the surface, so that the vehicle may maneuver at acceleration, steering, and/or braking rates more appropriate for the level of traction.

The disclosure is generally directed to systems and methods for estimating friction associated with a surface on which a vehicle travels. The systems and methods described herein may be used to assist with operation of a ground-borne vehicle. In some examples, the systems and methods according to this disclosure may be incorporated into vehicles having little or no autonomous capability in order to improve control of the maneuverability of the vehicle on surfaces providing different levels of friction between the vehicle's tires and the surface. Such examples may operate passively, for example, in a manner similar to and/or in coordination with existing traction control and anti-lock braking systems, such that they automatically override control inputs to prevent loss of traction and maintain control of the vehicle. According to other examples, the systems and methods may be incorporated into partially or fully autonomous vehicles that require limited or no driver control or attention, and that automatically alter the vehicle control systems to account for different levels of friction provided between the tires of the autonomous vehicle and the surface on which the vehicle is traveling.

In some examples, the systems may include a camera array including a plurality of cameras associated with the vehicle. The camera array may be orientated relative to the vehicle to obtain image data of the surface on which the vehicle travels, and the systems and methods may estimate friction-related data (e.g., a coefficient of friction) between the vehicle tires and surface based, at least in part, on the image data. The friction-related data may be used by a vehicle control system of the autonomous vehicle to assist with altering one or more operations of vehicle travel, such as, for example, rate of acceleration, rate of steering, and rate of deceleration via conventional and/or regenerative braking. According to some examples, the friction-related data may be used to assist with altering operation of vehicle safety systems configured to protect objects outside the vehicle from collisions with the vehicle and/or to protect occupants inside the vehicle from collisions. In some examples, the image data may be used to assist with controlling the operation of a ride control system configured to control compliance of the suspension of the vehicle.

In some examples, the systems and methods may include and/or access an events module configured to update a correlation between the image data and the friction-related data based on measured correlations between the image data and sensed traction events between the vehicle tires and surfaces on which the vehicle has travelled. For example, the vehicle may include sensors configured to detect loss of traction, and the events module may update or provide input to another system to update the correlations between the image data and the friction-related data. This may result in improvements in the accuracy of the correlations. In some examples, the systems and methods may include and/or access a location module configured to receive location data associated with the location of the vehicle and update the correlation between the image data and the friction-related data based, at least in part, on the location data.

Some examples of the systems and methods may include and/or use a reporting module in communication with a network. The reporting module may be configured to communicate data correlating a location of the vehicle with the friction-related data via the network. For example, a vehicle may share the correlations with servers, vehicles, and/or or other computing devices in communication with the network to provide updates about friction-related data and the corresponding locations. This may improve the accuracy of the friction-related data for one or more vehicles in communication with the vehicle and/or the network. According to some examples, the reporting module may be configured to be in communication with a company, public or private, that provides and/or maintains data about current conditions of roadways. In some examples, the communication could be with a government-affiliated department, such as, for example, a national or local government agency responsible for highway safety or maintenance, or a company serving as a private contractor for such agencies. This may alert such departments to conditions of the road surface that might merit attention, such as, for example, cracks or potholes in the road surface, or surfaces covered with deep water, snow, or ice.

In some examples, the systems and methods may include and/or access a receiver module in communication with a network and configured to receive updates relating to the correlation between the image data and friction-related data. For example, vehicles similar to those mentioned previously may communicate information to the vehicle including the receiver module and/or to a network in communication with the receiver module, so that the correlations associated with the vehicle may be updated. This may improve the accuracy of the correlations.

The techniques and systems described herein may be implemented in a number of ways. Example implementations are provided below with reference to the following figures.

Figure 2:
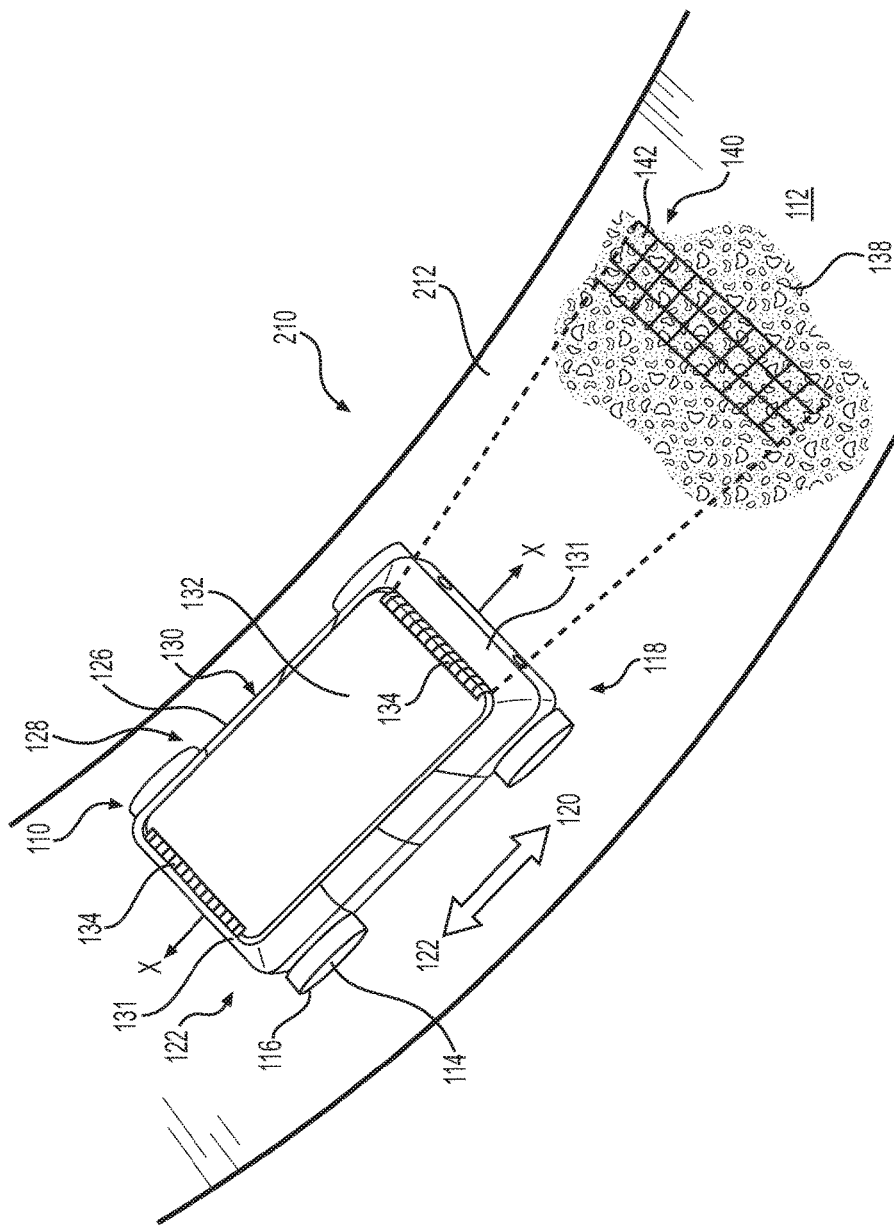
FIG. 2 is an overhead view of the vehicle and camera array shown in FIG. 1.

FIGS. 1 and 2 show an example of a vehicle 110 configured to travel across a surface 112 (e.g., a road surface), for example, to transport people and/or cargo from a first location to a second location. For the purpose of illustration, the vehicle 110 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The example vehicle 110 shown in FIGS. 1 and 2 is an automobile having four wheels 114 and respective tires 116 for each of the wheels 114. Other types and configurations of vehicles are contemplated, such as, for example, vans, sport utility vehicles, cross-over vehicles, trucks, buses, agricultural vehicles, and construction vehicles. The vehicle 110 may be powered by one or more internal combustion engines, one or more electric motors, hydrogen power, or any combination thereof. In addition, although the example vehicle 110 has four wheels, the systems and methods described herein may be incorporated into vehicles having fewer or a greater number of wheels, tires, and/or tracks. The example vehicle 110 has four-wheel steering and may operate generally with equal performance characteristics in all directions, for example, such that a first end 118 of the vehicle 110 is the front end of the vehicle 110 when traveling in a first direction 120, and such that the first end 118 becomes the rear end of the vehicle 110 when traveling in the opposite, second direction 122, as shown in FIGS. 1 and 2. Similarly, a second end 124 of the vehicle 110 is the front end of the vehicle 110 when traveling in the second direction 122, and such that the second end 124 becomes the rear end of the vehicle 110 when traveling in the opposite, first direction 120. These example characteristics may facilitate greater maneuverability, for example, in small spaces or crowded environments, such as parking lots and urban areas.

The example vehicle 110 shown in FIGS. 1 and 2 includes one or more doors 126 on each side 128 of the vehicle 110 for facilitating entry and exit of occupants to and from an interior space 130 of the vehicle 110. The systems and methods described herein may be incorporated into vehicles having fewer or a greater number of doors. The vehicle 110 shown in FIGS. 1 and 2 includes a windshield 131 and a roof 132 extending substantially (e.g., almost entirely) between the first and second ends 120 and 124 of the vehicle 110. In some examples, the vehicle 110 may not include a windshield. Because the example vehicle 110 is a Level 5 autonomous vehicle, a windshield is not necessary. However, in some examples, the vehicle 110 may include a windshield 131, regardless of whether the vehicle 110 is configured to be autonomous or manually controlled by a driver. In some examples, at least a portion of the roof 132 may include one more solar cells configured to supply electric energy to the vehicle 110 for powering one or more electrically powered systems of the vehicle 110.

In the example shown in FIGS. 1 and 2, the vehicle 110 includes a pair of camera arrays 134, one or more of which may include one or more imagers 136. The imagers 136 of the camera arrays 134 may be arranged in a predetermined pattern, for example, in order to provide a desired area of coverage of the surface 112 on which the vehicle 110 travels. For example, the pattern may be may relatively long in the width direction of the vehicle 110, but relatively narrow in the height direction. This may provide a desired width of image coverage on the surface 112. Other patterns and arrangements of the imagers 136 of the camera arrays 134 are contemplated.

The imagers 136 may be any known types of digital image sensors, digital cameras, and/or digital video cameras. For example, the imagers 136 may be high dynamic range (HDR) cameras to provide improved accuracy of the images. In some examples, the imagers 136 may include one or more of light-sensitive cameras, range sensors, tomography devices, RADAR, and/or ultra-sonic cameras. Other suitable types of imagers are contemplated. The imagers 136 may be selected to provide two-dimensional image data, three-dimensional image data, image sequences, gray image data, and/or color image data. In some examples, the imagers 136 may be selected to provide depth data, absorption data, and/or reflectance data.

As shown in FIGS. 1 and 2, the example camera arrays 134 may be mounted to a portion of the vehicle 110 that provides a line-of-site view of a portion 138 of the surface 112 in front of the vehicle 110 in the direction of travel. For example, as shown, each example camera array 134 is mounted to a portion of the roof 132 approaching the upper edge of a windshield 131. The camera array 134 may be mounted at a location generally corresponding to the upper edge of the windshield 131, for example, either outside or inside the windshield. In examples in which the camera array 134 is mounted inside the windshield, any distortion of the images resulting from the windshield may be corrected, for example, via lenses or algorithms configured to correct the image data. If the vehicle 110 were to include two windshields as a result of being bi-directional like the example vehicle 110, each camera array 134 could be mounted at a location generally corresponding to the upper edge of the windshield 131.

Although the example camera arrays 134 shown are mounted to the roof 132, one or more of the camera arrays 134 could be mounted at other portions of the vehicle 110. For example, one or more of the camera arrays 134 could be mounted to the first and/or second end of the vehicle 110, for example, at a location generally corresponding to the location of a bumper of a conventional car. According to some examples, one or more of the camera arrays 134 may be mounted to the underside of the vehicle 110. According to some examples, separate camera arrays 134 may be mounted to capture images of the surface 112 in the paths of each tire 116, or on each side of the vehicle 110.

According to some examples, one or more of the camera arrays 134 may be mounted in fixed manner, for example, so that images from the camera array 134 are taken from a constant orientation relative to the remainder of the vehicle 110. In such examples, the images would always be taken from the same angle relative to the longitudinal axis X of the vehicle 110 in both the vertical and lateral directions.

According to some examples, one or more of the camera arrays 134 may be mounted such that the orientation (e.g., aim) of the imagers 136 may be changed relative to the longitudinal axis X of the vehicle 110 in the vertical and/or lateral direction. For example, as shown in FIG. 2, the orientation of the camera array 134 is depicted as being directed slightly laterally relative to the longitudinal axis X toward the inside 210 of the curve 212 defined by the surface 112. Such examples may track the curve 212 based on the steering angle of the steering system of the vehicle 110, for example, in manner similar to headlights that follow steering inputs. Such examples may result in the image data obtained by the camera array 134 being associated with a portion 138 of the surface 112 across which the tires 116 of the vehicle 110 travel during a turning maneuver. This may improve the relevance of the image data obtained by the camera array 134. In some examples, the camera array 134 may be configured to change orientation relative to the longitudinal axis X, for example, so that the portion 138 of the surface 112 to which the imagers 136 are aimed is either father ahead or closer to the vehicle 110. In some examples, the camera array 134 may be configured to change orientation relative to the surface 112, for example, so that the portion 138 of the surface 112 to which the imagers 136 are aimed is either farther ahead or closer to the vehicle 110. In some examples, the camera array 134 may be configured to rotate in order to change orientation. For example, if the vehicle 110 is traveling at a higher speed, the camera array 134 may be aimed farther beyond the front of the vehicle 110, so that there is relatively more time for the vehicle 110 to respond to the image data obtained by the camera array 134. Conversely, if the vehicle 110 is traveling at a relatively slower speed, the camera array 134 may be aimed closer to the front of the vehicle 110. In some examples, the camera array 134 is mounted to permit one or more of these changes in orientation. In such examples, one or more of the imagers 136 may be configured to alter its focal length to account for changes in distance between the imagers 136 and the portion 138 of the surface 112 at which the imagers 136 are aimed.

As shown in FIGS. 1 and 2, the example camera arrays 134 are configured to obtain image data of the portion 138 of the surface 112 according to a predetermined grid-like pattern 140, for example, in the path of travel of the vehicle 110. In some examples, the imagers 136 are aimed along parallel axes. The grid-like pattern 140 may include a matrix of overlapping units 142 each corresponding to one of the imagers 136. Although the overlapping units 142 shown in FIGS. 1 and 2 appear to be adjacent rather than overlapping, it should be appreciated that one or more of the units 142 overlap with at least units 142 that are adjacent to one another. In such examples, the overlapping image data captured by adjacent imagers 136 of the camera array 134 provides image data of common portions of the surface 112 viewed from slightly different angles. This may provide more complete image data, which may improve the accuracy of the analysis of the image data. Although the example grid-like pattern shown in FIGS. 1 and 2 has rectangular units 142, patterns having other configurations and/or units having alternative shapes are contemplated. In some examples, stereoscopy may be used to recover depth information from intensity images via disparity calculations.

Figure 3:
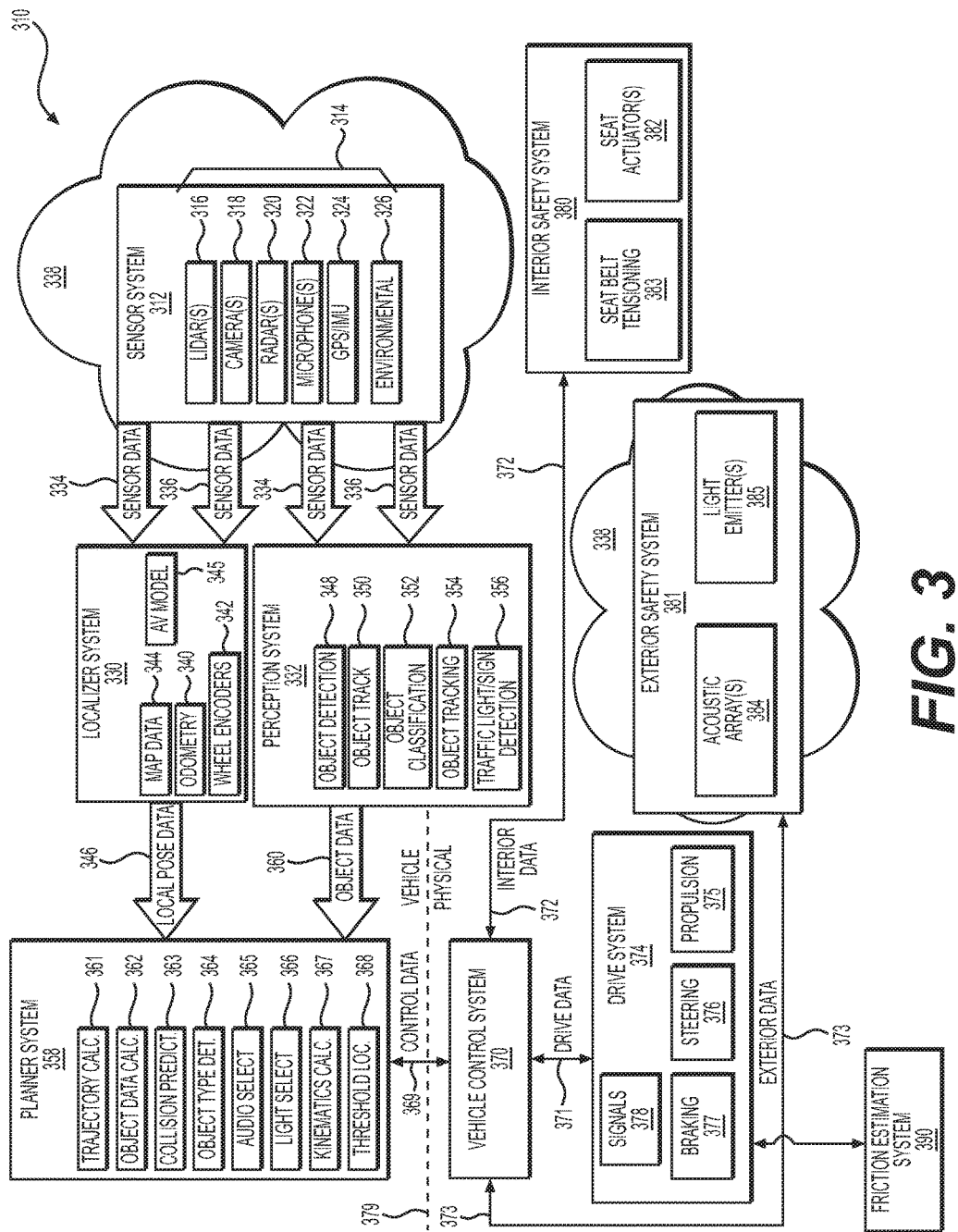
FIG. 3 is a block diagram of an example operation control system for controlling a vehicle.

FIG. 3 is a block diagram of an illustrative operation control system 310 configured to control operations of the vehicle 110. In various implementations, the operation control system 310 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA.

The operation control system 310 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the operation control system 310 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example shown in FIG. 3, the operation control system 310 includes a sensor system 312 including a plurality of sensors 314. The sensors 314 may include, for example, light detection and ranging sensors (LIDAR) 316, image capture sensors 318 (e.g., cameras or other imagers), radio detection and ranging sensors (RADAR) 320, sound capture sensors 322 (e.g., microphones), global positioning system sensors (GPS), and/or inertial measurement unit sensors (IMU) 324. The sensor system 312 may also include one or more environmental sensors 326, such as, for example, one or more sensors for detecting ambient temperature, temperature of the road surface, humidity, and barometric pressure.

The operation control system 310 may also include a localizer system 330 and a perception system 332 that may receive location and environment sensor data 334 and/or object sensor data 336, respectively, from one or more of the sensors 314 of the sensor system 312. For example, the localizer system 330 may receive location and environment sensor data 334 associated with the location of the vehicle 110 in environment 338, such as from GPS/IMU 324. The perception system 332 may receive object sensor data 336 relevant to determine information associated with objects in the environment 338 surrounding the vehicle 110, such as sensor data from LIDAR 316, image capture sensors 318, RADAR 320, environmental sensors 328, and/or sound capture sensors 322. In some examples, the localizer system 330 may receive data from sources other than the sensor system 312, such as, for example, map data, map tile data, route data, route network definition file (RNDF) data, a data store, and/or a data repository. In some examples, the location and environment sensor data 334 received by the localizer system 330 may be identical (or at least similar to) to the object sensor data 336 received by the perception system 332. In some examples, the sensor data 334 and 336 received by the localizer system 330 may not be identical to the sensor data 334 and 336 received by the perception system 332. The sensor data 334 and/or 336 may each include data from any combination of one or more sensors or sensor types in the sensor system 312. The amounts and types of sensor data 334 and/or 336 may be independent from one another and/or may be similar or equivalent.

The localizer system 330 may receive and/or access data from sources other than sensor data 334 and 336, such as, for example, odometer data 340 from motion sensors configured to estimate a change in position of the vehicle 110 over time, wheel encoders 342 configured to calculate motion, distance, and other metrics associated with the vehicle 110 based on the rotations of one or more of the wheels 114, map data 344 from data representing map tiles, route data, RNDF data, and/or other data, and data representing the model and/or type of vehicle corresponding to the vehicle 110, which may be used to calculate vehicle location data based on vehicle dynamics modeling 345 (e.g., from simulations, captured data, etc.) of the vehicle 110.

The localizer system 330 may use one or more of the data resources indicated herein to generate data representing local position and orientation data (local pose data) 346. In some examples, the perception system 332 may analyze, process, and/or manipulate sensor data 334 and 336 to implement an object detection 348 strategy, an object track 350 strategy (e.g., determining the detected objects that are static and the objects that are in motion), an object classification 352 strategy (e.g., identifying the object type (e.g., car, motorcycle, cyclist, pedestrian, skate boarder, mailbox, building, and street lights)), an object tracking 354 strategy (e.g., tracking an object based on movement of the object in the environment 338), and a traffic light/sign detection 356 strategy (e.g., identifying traffic lights, stop signs, rail-road crossings, lane markers, and pedestrian cross-walks).

In the example shown, the operation control system 310 also includes a planner system 358 configured to receive the local pose data 346 and object data 360, and analyze the local pose data 346 and the object data 360 to implement functions including, for example, a trajectory calculation 361, an object data calculation 362, a collision prediction 363, an object type detection 364, an audio signal selection 365, a light pattern selection 366, a kinematics calculation 367, and a threshold location estimation 368. The example planner system 358 may communicate trajectory and control data 369 to a vehicle control system 370. The vehicle control system 370 may be configured to process the control data 369 to generate drive system data 371, interior safety system data 372, and exterior safety system data 373. The drive system data 371 may be communicated to a drive system 374, and the drive system 374 may be configured to communicate the drive system data 371 to a propulsion system 375, a steering system 376, a braking system 377, and a signal system 378 (e.g., turn signals, brake signals, headlights, and/or running lights). For example, the drive system data 371 may include propulsion data (e.g., a voltage, current, or power signal for electric motors, and/or a throttle signal for internal combustion engines) for the propulsion system 375, steering angle data for the steering system 376 (e.g., a steering angle setting), and braking data for the braking system 377 (e.g., a deceleration rate to be achieved).

In the example shown in FIG. 3, a dashed line 379 may represent a demarcation between a vehicle trajectory processing layer and a vehicle physical execution layer, where data processed in the vehicle trajectory processing layer is implemented by one or more of the drive system 374, an interior safety system 380, and/or an exterior safety system 381. For example, one or more portions of the interior safety system 380 may be configured to enhance the safety of occupants of the vehicle 110 in the event of a collision and/or other event, such as an abrupt collision avoidance maneuver by the vehicle 110. In some examples, one or more portions of the exterior safety system 381 may be configured to reduce impact force or other adverse effects of a collision.

The interior safety system 380 may include systems, such as, for example, a seat actuator system 382 and a seat belt tensioning system 383. For example, the seat actuator system 382 and the seat belt tensioning system 383 may be mounted at one or more locations associated with the interior space 130 (see FIG. 1) of the vehicle 110, and may be coupled to, for example, a seat, the floor, a support rail, a support bracket, a support pillar, or other structures. In some examples, the seat actuator system 382 may be configured to move a seat from a first position to a second position using energy from, for example, the impact force of a collision, and may apply a counteracting force to the seat in order to control the acceleration of the seat. In some examples, the counteracting force may be provided by a spring and/or damper of the seat actuator system 382. In some examples, the seat belt tensioning system 383 may be configured to retract a seat belt deployed about an occupant in order to pre-tension or tighten it about the occupant prior to a collision predicted by the planner system 358. The seat actuator system 382 and the seat belt tensioning system 383 may be coupled with one or more structures configured to support mechanical loads occurring due to a collision, abrupt vehicle acceleration or deceleration, evasive maneuvers, sharp turns, and/or hard braking.

The exterior safety system 381 may include systems, such as, for example, an acoustic array system 384 and a light emitter system 385. In some examples of the systems of the exterior safety system 381, the systems may be configured to interact with the environment 338 surrounding the vehicle 110, for example, by emitting a steered beam of acoustic energy into the environment 338 using one or more acoustic arrays, and/or by emitting light into the environment 338 using one or more light emitters of the light emitter system 385. The sound and/or light emitted may provide audible and/or visual warnings to objects in the environment 338, such as other vehicles, pedestrians, and cyclists. In some examples, the acoustic arrays may emit acoustic energy into the environment 338 using, for example, transducers, air horns, or resonators. The acoustic energy may be omnidirectional, or may constitute a steered beam or focused sound (e.g., a sound emitted from a directional acoustic source, a phased array, a parametric array, a large radiator, and/or an ultrasonic source). Systems of the exterior safety system 381 may be positioned at one or more portions of the vehicle 110 configured to allow the systems to interact with the environment 338, such as a location associated with an external surface of the vehicle 110.

As shown in FIG. 3, the example operation control system 310 also includes a friction estimation system 390 configured to determine friction-related data associated with the surface 112 on which the vehicle 110 travels. In some examples, the friction estimation system 390 may be in communication with the vehicle control system 370, either directly or via one or more systems of the operation control system 310. For example, the friction estimation system 390 shown in FIG. 3 is in communication with the drive system 374, which in turn, is in communication with the vehicle control system 370. As explained in more detail herein, the friction-related data may be used to alter or modify operation of one or more of the drive system 374, the propulsion system 375, the steering system 376, the braking system 377, the interior safety system 380, and the exterior safety system 381, in order to adjust or optimize operation of the vehicle 110 to the level of friction between the tires 116 of the vehicle 110 and the surface 112 on which the vehicle 110 travels. In some examples, the friction estimation system 390 may also use data obtained from one or more of the sensor system 338, the localizer system 330, the perception system 332, and the planner system 358, for example, by fusing such data with the image data to obtain the friction-related data.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the operation control system 310 is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The operation control system 310 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated operation control system 310. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the operation control system 310 may be transmitted to the operation control system 310 via transmission media or signals such as electrical, electromagnetic, or digital signals, conveyed via a communication medium such as a wireless link. Various implementations may further include receiving, sending or storing instructions and/or data implemented in accordance with the foregoing description on a computer-accessible medium. Accordingly, the techniques described herein may be practiced with other control system configurations. Additional information about the operations of the modules of the vehicle 110 is discussed below.

Figure 4:
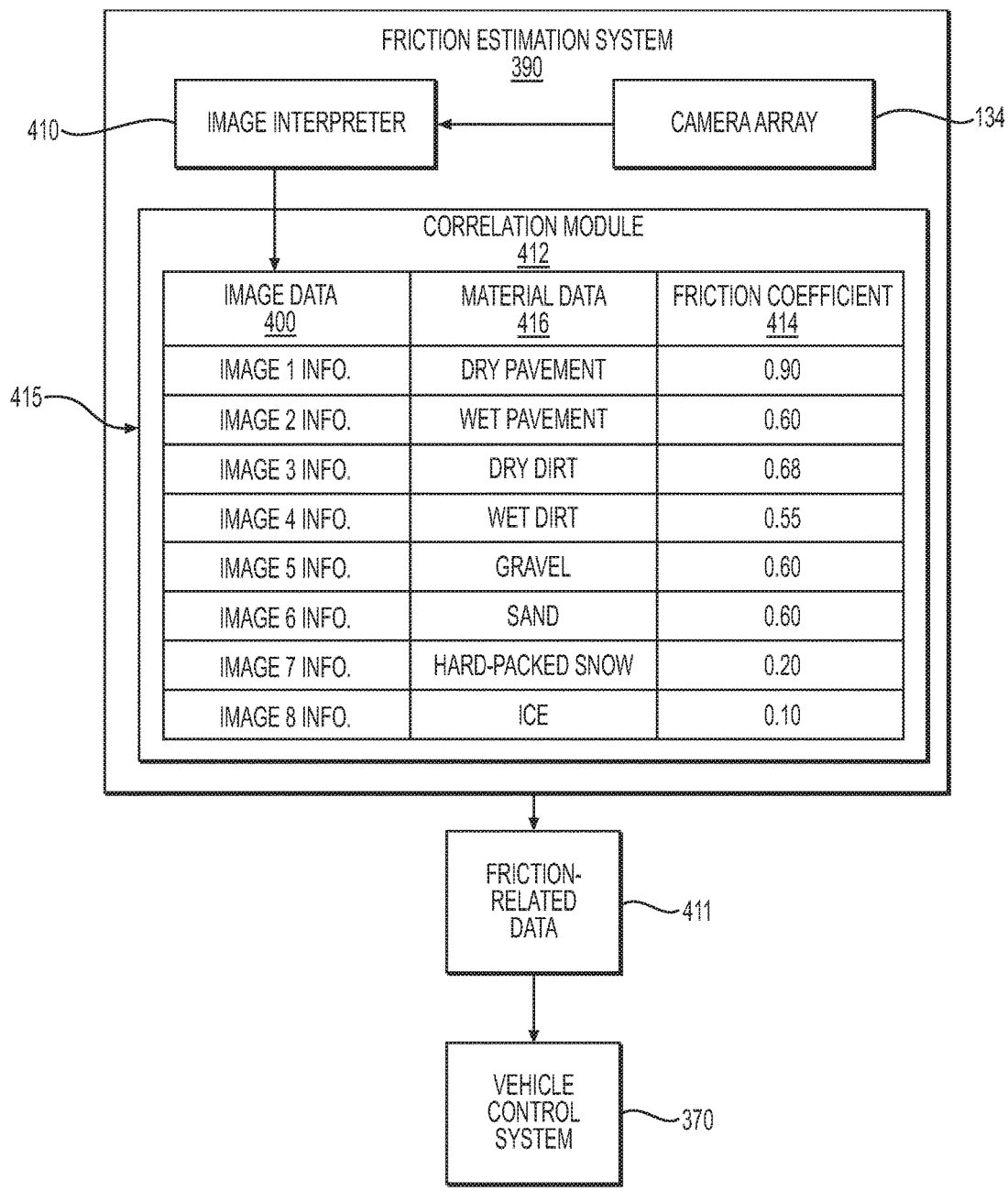
FIG. 4 is a block diagram of an illustrative friction estimation system.

FIG. 4 is a block diagram of an example showing additional details of the friction estimation system 390 and its interaction with the vehicle control system 370. In the example illustrated, the friction estimation system 390 includes one or more of the camera arrays 134 (see FIGS. 1 and 2), one or more of which includes one or more of the imagers 136 configured to capture image data 400 associated with the surface 112. The example friction estimation system 390 may also include an image interpreter 410 in communication with the one or more camera arrays 134. The image interpreter 410 may be configured to receive the image data 400 from the camera array(s) 134 and determine friction-related data 411 associated with the surface 112 based, at least in part, on the image data 400. In some examples, the image interpreter 410 is configured to be in communication with the vehicle control system 370, either directly or via other systems, and provide the friction-related data 411 to the vehicle control system 370.

In some examples, the friction-related data 411 may be determined by the image interpreter 410 based on an image depth profile obtained from the image data 400 from the camera array 134 and analyzed according to one or more machine learning procedures, such as, for example, a convolutional neural network (CNN), a support vector machine (SVM), a random decision forest regression analysis, and/or any other suitable regression analysis. For example, the camera array 134 may be a plenoptic multi-camera system focused on a relatively small portion 138 of the surface 112 and configured to obtain an image depth profile by defocusing the one or more imagers 136 of the camera array 134. In some examples, the image depth profile may provide micrometer level resolution and/or a tight tolerance on objects from the focal point. In some examples, the image depth profile may be enhanced using multi-views from the imagers 136, which may provide overlapping image data 400.

Regarding analysis of the image data 400, in some examples, the one or more machine learning procedures may be configured to be trained by inputting known image data, and in some examples, other known parameters, along with known friction-related data corresponding to the known image data and parameters. Based on this training, the machine learning procedures may receive image data 400 (e.g., the image depth profiles) and other known parameters, and the image interpreter 410 may correlate or determine the friction-related data corresponding to the image data 400 and other known parameters. For example, to the extent the image data and/or parameters is/are different than those input for training, the machine learning procedures may determine the friction-related data by taking one or more of those differences into account when determining the current friction-related data. Examples of other known parameters include, but are not limited to, any data associated with the vehicle 110, such as, for example, data from the sensor system 338 (e.g., environmental conditions such as temperature, ambient pressure, and humidity, location information from the GPS and/or IMU 324, map data 344, wheel encoder data 342, and/or odometer data 340), and/or other data, such as, for example, tire data, such as depth of tread, tire pressure, tire temperature, and tire size, and/or operation of vehicle systems such as windshield wipers and head lights.

The use of the image depth profiles and machine learning procedures such as described above, may be distinguished from a texture-based analysis of images, for example, such as those used by Machine Vision Group that may rely on multi-channel filtering techniques, such as multi-channel Gabor filtering techniques. In some examples, the friction-related data 411 may be estimated solely based on the image depth profile and machine learning procedures. In some examples, the friction-related data 411 may be estimated based on the image depth profile and machine learning procedures analysis of the image data 400 in combination with a texture-based analysis of the image data 400.

In some examples, the image interpreter 410 may use the above-noted image depth profile and machine learning procedures to analyze the image data 400 and determine characteristics related to the surface 112 that may be used to identify one or more material characteristics of the surface 112, such as, for example, the type of material, the surface characteristics of the material (e.g., characteristics such as smooth or abrasive), and/or whether the surface 112 is fully or partially coated with, for example, dirt, water, snow, and/or ice. For example, the image interpreter 410 in some examples may use feature extraction techniques to identify lines, edges, ridges, textures, and shapes in the image data 400.

In some examples, the image data 400 may be pre-processed to, for example, re-sample it, reduce noise in the data, and/or enhance the contrast in the image data 400. In some examples, the image interpreter 410 may use one or more of the following techniques to analyze the image data 400: point of interest selection, segmentation, image recognition, and image registration. In some examples, multi-view stereo techniques may be used to acquire and analyze the image data 400. In some examples, the amount of data associated with the image data 400 may be increased by perturbing the image data 400.

In some examples, the friction-related data 411 may include a friction coefficient 414 between one or more of the tires 116 of the vehicle 110 and the surface 112 on which the vehicle 110 travels. The friction coefficient 414 may static or kinetic and may be representative of the ratio of the frictional force between the tire 116 and the surface 112, to the force pressing the tire 116 against the surface 112. Thus, as the friction coefficient 414 increases, the frictional force between the tire 116 and the surface 112 increases proportionally. All other relevant parameters being equal, as the frictional force increases, for example, due to an increase in the friction coefficient 414, the traction of the tire 116 increases, thereby improving the potential performance of the vehicle 112, including its maximum rate of acceleration, its maximum cornering speed, and its maximum rate of deceleration or braking. The friction-related data 411 may include data that is different, or at least in a different form, than the friction coefficient 414. For example, the friction-related data 411 may be any data that relates to the frictional force between the tire 116 and the surface 112, such as, for example, data that is mathematically related to the frictional force or the friction coefficient 414. For example, the friction-related data 411 may vary proportionally or geometrically, or via another mathematical relationship, with the friction coefficient 414. In some examples, the friction-related data 411 may be divided into passive friction-related data and active friction-related data. For example, the friction-related data 411 may be divided into friction coefficients related to the surface 112 (passive) and friction coefficients related to the tire surface (active).

As shown in FIG. 4, the illustrated example of the friction estimation system 390 includes a correlation module 412 in communication with the image interpreter 410. In some examples, the correlation module 412 is an integral part of the image interpreter 410. The correlation module 412 is configured to provide a correlation between the image data 400 and the friction-related data 411. In some examples, the image interpreter 410 is configured to determine the friction-related data 411 associated with the surface 112 based, at least in part, on the correlation between the image data 400 and the friction-related data 411. In some examples, the correlation between the image data 400 and the friction-related data 411 may include at least one of a correlation table correlating the image data 400 and friction-related data 411, or a mathematical relationship between the image data 400 and the friction-related data 411. In some examples, the correlation between the image data 400 and the friction-related data 411 may be determined according to the above-noted image depth profile and machine learning techniques.

In the example shown in FIG. 4, the correlation module 412 includes a correlation table 415. The example correlation table 415 provides a correlation between image data 400 obtained from the camera array 134 (FIGS. 1 and 2) and material data 416 related to a material associated with the surface 112 on which the vehicle 110 travels. In the example shown, the correlation table 415 also provides a correlation between the material data and estimated friction-related data 411 associated with the friction between the tires 116 of the vehicle 110 and the surface 112. For example, the correlation module 412 receives the image data 400 from the camera array 134 and uses the correlation table 415 to identify the material from the correlation table 415 that most closely matches the material of the surface 112 captured in the image data 400. As noted above, this correlation may be based solely on image depth profile and machine learning techniques, such as those described above obtained from the image data 400, both image depth profile and machine learning techniques and any texture data from the image data 400, or solely on texture data from the image data 400. Based on the material identified, the correlation module 412 uses the correlation table 415 to identify the estimated friction-related data 411, for example, as shown in FIG. 4.

As shown in FIG. 4, the example correlation table 415 shows image data 400 including image 1 information through image 8 information. The example correlation table 415 also includes example material data 416 associated with a material from which the surface 112 is made, corresponding to image 1-8 information, and example friction coefficients 414 corresponding to the example material data 416. In this example, the correlation table 415 receives the image data 400 from the one or more camera arrays 134. The example correlation table 415 represents discrete images received from the camera arrays 134 as image 1 information, image 2 information, image 3 information, through image 8 information. The camera arrays 134 may be configured to capture the discrete image data 400 at, for example, predetermined time intervals or some other triggering events.

Based on the content of the image data 400, the image interpreter 410 determines the material data 416 that most closely matches the image data 400 from a discrete image. For example, the image interpreter 410 receives the image 1 information, analyzes it, and determines that the image data 400 for the image 1 information most closely correlates to dry pavement from the material data 416. In some examples, this determination may be made according to the image depth profile and machine learning techniques described previously herein. The image interpreter 410 further determines the friction coefficient 414 that corresponds to the correlating material data 416 of dry pavement. In some examples, this determination may be made according to the image depth profile and machine learning techniques described previously herein. In the example shown, dry pavement may have a friction coefficient 414 of about 0.90. Thus, the friction-related data 411 for this example would be 0.90. Similarly, for image data 400 corresponding to the image 7 information, the image interpreter 410 correlates the discrete image 7 information with the material data 416 corresponding to hard-packed snow. The friction coefficient 414 corresponding to hard-packed snow is about 0.20, and thus, for this example, the friction-related data 411 would be 0.20. The order of the image data 400 and material data 416 shown in FIG. 4 is merely illustrative and other orders and arrangements are contemplated.

The example list of material data 416 is not exhaustive, and merely provides several examples for the purpose of demonstration. Other surface materials and the corresponding data may also be included, such as, for example, paving stones, cobble stones, and concrete. In addition, within each of the material data 416 examples shown in FIG. 4, there may be further sub-categories. For example, within dry pavement, there may be many different sub-categories, such as, for example, "abrasive," "smooth," "new," and "worn," which may each correlate to unique friction-related data 411 or friction coefficients 414. In addition, the example friction coefficients 414 are for discussion purposes only and should not be viewed as limiting.

Figure 5:
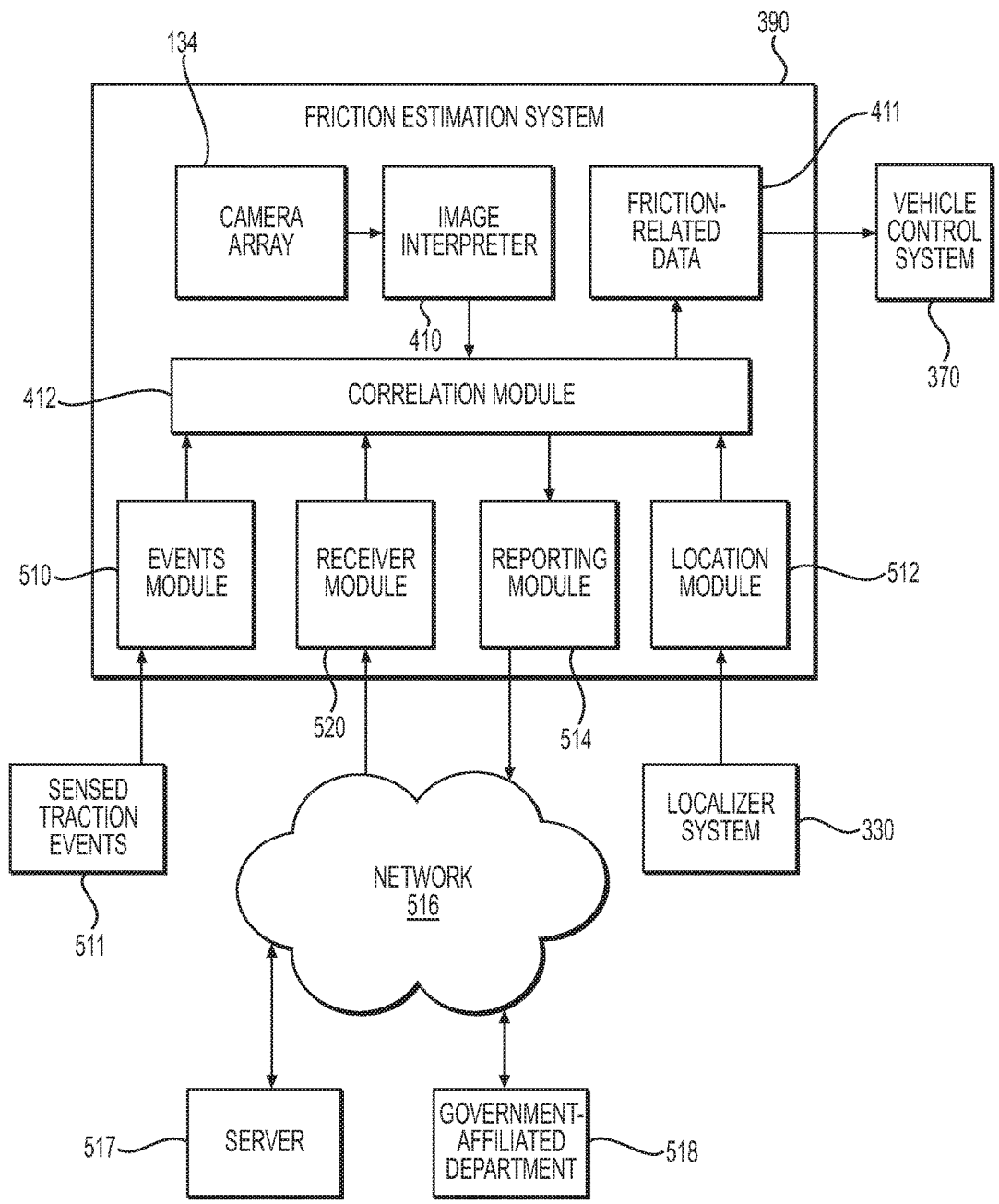
FIG. 5 is a block diagram of an illustrative friction estimation system and other systems for controlling a vehicle.

FIG. 5 illustrates another example of a friction estimation system 390 and its interaction with other systems. The example friction estimation system 390 shown in FIG. 5 includes an events module 510 configured to update the correlation between the image data 400 and the friction-related data 411. For example, the updates to the correlation may be based on measured correlations between the image data 400 and sensed traction events 511 between the tires 116 of the vehicle 110 and surface 112 on which the vehicle 110 has travelled. This may improve the accuracy of the correlations over time.

For example, some examples of the vehicle 110 may include sensors that may be used to detect slip between one or more of the tires 116 of the vehicle 110 and the surface 112 during operation. For example, the slip may be detected by the wheel encoder 342, the IMU 324, and/or a traction control system. Such instances indicate that the friction-related data 411 corresponding to the image data 400 represent an over-estimation of the level of the friction-related data 411 (e.g., the friction coefficient 414 correlated with the image data 400 has been over-estimated) because there was less traction associated with the surface 112 than estimated by the friction estimation system 390. In such instances, the events module 510 may receive the information relating to the loss of traction between the one or more tires 116 and the surface 112, and associate the image data 400 obtained from the camera array 134 to the reduced friction-related data 411 value. The events module 510 may thereafter update the correlation module 412 (e.g., the correlation table 415) to provide an updated correlation between the image data 400 and the correlated friction-related data 411, for example, to reduce the value of the friction-related data 411 accordingly. In some examples, the events module 510 may provide the information to the machine learning system, which may update a machine learning model to incorporate the information into its future calculations, for example, according a procedure sometimes referred to as "online training." In this example manner, the events module 510 may serve to update the correlation module 412 to correlate certain image data 400 with certain friction-related data 411 based on sensed traction events 511. For example, the friction-related data 411 associated with the image data 400 may be reduced by, for example, a predetermined range, in order to prevent a loss of traction between the tires 116 and surface the 112 when the image data 400 is the same (or very similar) to the image data 400 associated with the loss of traction. In this example manner, the friction estimation system 390 may improve its accuracy over time.

In the example shown in FIG. 5, the friction estimation system 390 also includes a location module 512 configured to receive location data associated with a location of the vehicle 112 and update the correlation between the image data 400 and the friction-related data 411 based, at least in part, on the location data. For example, the location module 512 may be in communication with the correlation module 412 and the localizer system 330 of the vehicle 110. The location module 512 may receive location updates from the localizer system 330 and correlate the location to the image data 400 and/or the friction-related data 411, and store such correlations for later use. In this manner, the correlation module 512 and/or the correlation table 415 may be expanded to provide correlations between the image data 400 received from the camera array 134, the material associated with the surface 112 on which the vehicle 112 travels, the friction-related data 411, and the location of the vehicle 112. For such examples, the friction estimation system 390 may obtain the current or projected position of the vehicle 110 from the localizer system 330 and estimate the friction-related data 411 for that particular location based on a correlation between the location and the friction-related data 411. In some examples, if a predetermined amount of time has lapsed between acquisition of the correlation between the image data 400, material data, friction-related data, and location, the location aspect of the correlation may be discounted because the information is stale, and may rely more heavily on the real-time image data 400 to estimate the friction-related data 411. This may account for situations in which the location aspect of the correlation was acquired while the surface 112 was dry, and later when the vehicle 110 approaches that location again and the surface 112 is wet. The image data 400 will take precedent over the location data and prevent the friction estimation system 390 from over estimating the friction-related data 411.

In some examples, as the vehicle 112 travels along its path between destinations, the localizer system 330 may update the correlation between the friction-related data 411 and location based on past friction-related data 411 determined previously for the surface 112 at the locations along the path. In examples also including the events module 510, the updates to the correlations between the image data 400 and the friction-related data 411 made by the events module 510 may be correlated to the location of the vehicle. In such examples, the correlations may become more accurate over time as the correlations are updated with respect to paths on which the vehicle 110 has travelled. As the vehicle 110 travels along a path already traveled, the friction estimation system 390 may base its friction-related data 411 estimations on the previously obtained and/or updated correlations.

Some examples of the friction estimation system 390 may also include a reporting module 514 in communication with a network 516 and configured to communicate data to the network 516. For example, the reporting module 514 may be configured to send correlations from the correlation module 412 (e.g., from the correlation table 415) to the network 516, so that the correlations may be shared with other vehicles in a fleet of the vehicles via, for example, a server 517 that includes a database of correlations for the fleet. In examples including a location module 512, the reporting module 514 may be configured to communicate data correlating the location of the vehicle 110 and the friction-related data 411 to the network 516, which in turn, may communicate the correlations to the server 517. These correlations may be sent, for example, via the server 517 and the network 516, to other vehicles in the fleet, so that they can update their respective correlation modules and/or correlation tables. In such examples, vehicles in the fleet may collectively create a large database of correlations between location, image data 400, material data 416, and friction-related data 411.

Some examples of the friction estimation system 390 that include reporting modules 514 may be configured to report friction-related data 411 to a company, public or private, that provides and/or maintains data about current conditions of roadways. In some examples, the communication could be with a government-affiliated department 518, either directly or via the network 516, for example, as shown in FIG. 5. The government-affiliated department 518 may be, for example, a national or local government agency responsible for highway safety or maintenance, or a company serving as a private contractor for such agencies. This may alert such departments to conditions of the road surface that might merit attention, such as, for example, cracks or potholes in the road surface, or surfaces covered with deep water, snow, or ice. The department may use such information to dispatch and repair or treat the surface as appropriate in order to prevent further damage to the surface or vehicles, or to mitigate hazardous road conditions.

In some examples, the friction estimation system 390 may include a receiver module 520 in communication with the network 516. The receiver module 520 may be configured to receive updates relating to correlations between, for example, the image data 400 and friction-related data 411 via the network 516. In some examples, the reporting module 514 and the receiver module 520 may be integrated into a common communications module.

In some examples, the receiver module 520 may be configured to receive correlations between the image data 400, the material data 416, the friction-related data 411, and/or location data via the network 516. Based on these correlations, the correlation module 412 may update its correlations (e.g., the correlation table 415). For example, the data received by the receiver module 520 may include correlations between image data 400 and friction-related data 411 obtained from other vehicles in a fleet of the vehicles, and the correlation module 412 may update its correlations accordingly, for example, via the events module 510. In addition, or alternatively, the data received by the receiver module 520 may include correlations between the location data and the friction-related data 411, and the correlation module 412 may update its correlations accordingly, for example, via the events module 510. For such examples, the friction estimation system 390 may obtain the current or projected position of the vehicle 110 from the localizer system 330 and estimate the friction-related data 411 for that particular location based on a correlation between the location data and the friction-related data 411. In this example manner, the vehicles of a fleet of vehicles may benefit from the collective friction-related data 411 of the vehicles of the fleet that have such capabilities.

Figure 6:
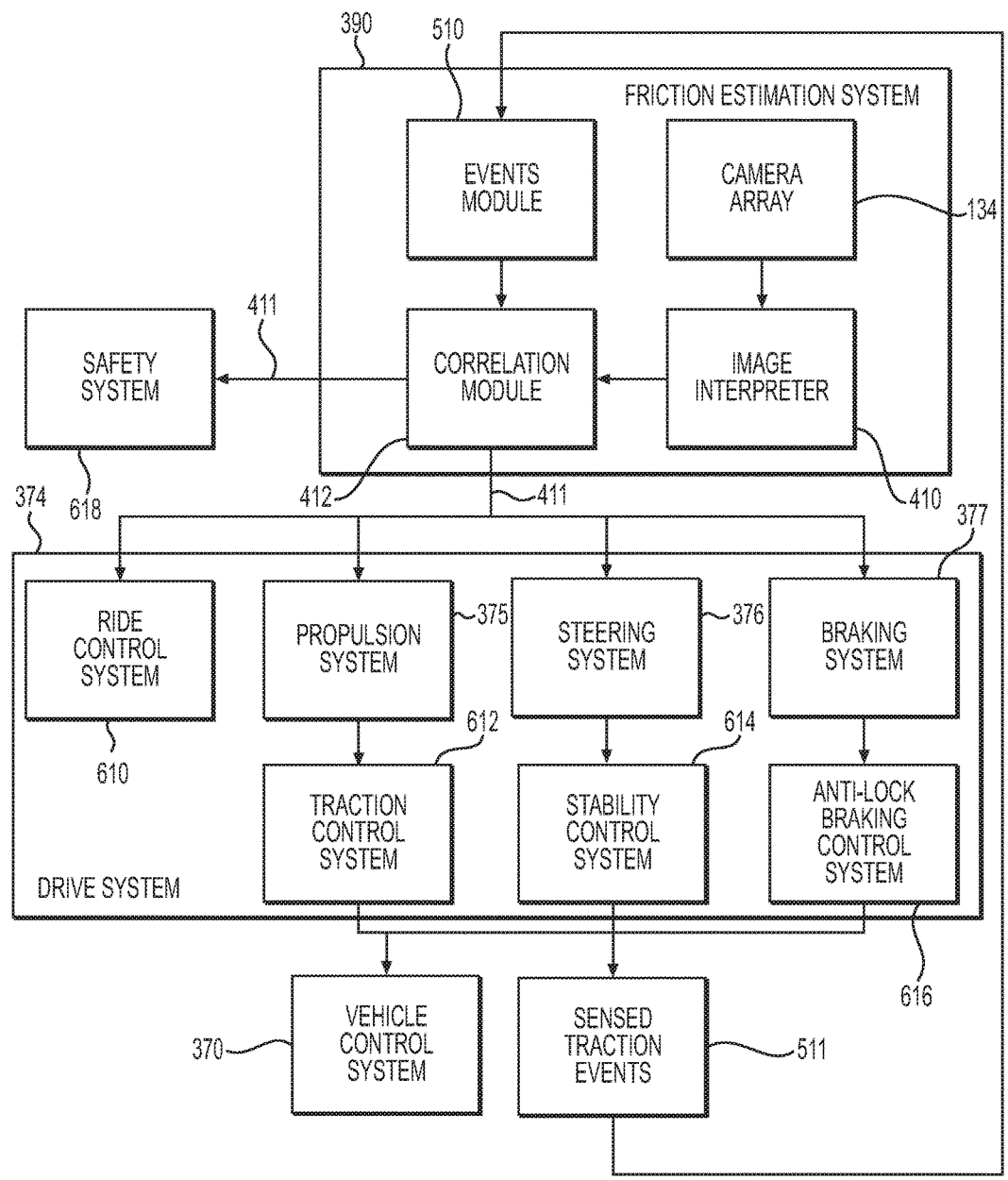
FIG. 6 is a block diagram showing an illustrative vehicle control system for controlling a vehicle.

FIG. 6 illustrates an example of an implementation of a friction estimation system 390 into a vehicle control system 370. In the example shown, the friction estimation system 390 includes one or more camera arrays 134 (see FIGS. 1 and 2) including a plurality of imagers 136. Image data 400 from the camera arrays 134 is received by the image interpreter 410, which uses the correlation module 412 to determine the friction-related data 411 associated with the surface 112 on which the vehicle 110 travels based on the image data 400. As shown in FIG. 6, the vehicle control system 370 may include a drive system 374 (see, e.g., FIG. 3) in communication with the friction estimation system 390 and configured to control maneuvering of the vehicle 110. For example, as shown in FIG. 3, the drive system 374 may include one or more of a propulsion system 375 configured to propel the vehicle 110 on the surface 112, a steering system 376 configured to alter a direction of travel of the vehicle 112, and a braking system 377 configured to reduce a speed of travel of the vehicle 112. In some examples, the vehicle control system 370 (e.g., the drive system 374) is configured to receive the friction-related data 411 from the friction estimation system 390, either directly or indirectly, and control maneuvering of the vehicle 110 based, at least in part, on the friction-related data 411.

In some examples, the drive system 374 is configured to receive the friction-related data 411 from the friction estimation system 390 and alter propulsion of the vehicle 112 from the propulsion system 375 based, at least in part, on the friction-related data 411. In some examples, the drive system 374 is configured to receive the friction-related data 411 from the friction estimation system 390 and alter a steering angle of the steering system 376 based, at least in part, on the friction-related data 411. In some examples, the drive system 374 is configured to receive the friction-related data 411 from the friction estimation system 390 and alter a rate of deceleration of the vehicle 110 from the braking system 377 based, at least in part, on the friction-related data 411. In some examples of the drive system 374, any combination of the propulsion system 375, steering system 376, and braking system 377 may be configured to receive the friction-related data 411 and alter operation of the respective system(s).

For example, as the magnitude of the friction-related data drops (e.g., the coefficient of friction drops), operation of any combination of the propulsion system 375, steering system 376, and braking system 377 may be altered by reducing the rate of acceleration provided by the propulsion system 375, reducing the rate and/or magnitude of the steering input provided by the steering system 376, and reducing the rate of deceleration or braking input provided by the braking system 377. The reduction(s) may prevent the loss of traction during such maneuver(s) by reducing the amount of traction required to perform the maneuver(s). In some examples, as the magnitude of the friction-related data increases, operation of any combination of the propulsion system 375, steering system 376, and braking system 377 may be altered by increasing the rate of acceleration provided by the propulsion system 375, increasing the rate and/or magnitude of the steering input provided by the steering system 376, and increasing the rate of deceleration or braking input provided by the braking system 377. Such increase(s) may improve the performance of the vehicle maneuvering in view of the relative increase in traction resulting from the increase in the friction-related data.

As shown in FIG. 6, some examples of the drive system 374 also include a ride control system 610 configured to control compliance of the suspension of the vehicle 110. The ride control system 610 may be configured to control the compliance based, at least in part, on the image data 400 and/or the friction-related data 411. For example, the vehicle 110 may include an adjustable suspension system, and the compliance of the suspension system may be altered based on changes in the surface 112 on which the vehicle 110 travels. For example, the image data 400 may indicate that the surface 112 is rough, includes speed bumps, or has undulations that would be more comfortably traversed if the suspension is more compliant. Similarly, on surfaces 112 providing relatively less friction, having a more compliant suspension may provide relatively more traction, and thus, in some examples, the compliance of the suspension may be increased with a decrease in the magnitude of the friction-related data 411. Conversely, the compliance of the suspension may be reduced on relatively smoother surfaces and/or surfaces providing relatively more friction, and the ride control system 610 may be configured to adjust the compliance of the suspension accordingly. In some examples, the suspension may be adjustable via an air pressure adjustment of air-type shock absorbers and/or springs, via a hydraulic pressure adjustment of hydraulic-type shock absorbers and/or springs, or via changes to a magnetically adjustable shock absorber and/or spring suspension system.

As shown in in FIG. 6, the drive system 374 may also include at least one of a traction control system 612 configured to alter output of the propulsion system 375 based, at least in part, on sensing slip between one or more tires 116 of the vehicle 110 and the surface 112, a stability control system 614 configured to selectively control rotation of one or more tires 116 of the vehicle 110 based, at least in part, on sensing slip between one or more of the tires 116 during turning of the vehicle 110, or an anti-lock braking control system 616 configured to prevent one or more tires 116 of the vehicle 110 from ceasing rotation during braking of the vehicle 110. For example, the traction control system 612 may be configured to sense a traction event including slip between one or more of the tires 116 during acceleration of the vehicle 100, and upon detecting slip, reducing the power output being provided to the slipping tire 116, so that the tire 116 does not continue to slip during acceleration. The stability control system 614, in some examples, may be configured to sense a traction event including the slipping or one of more of the tires 116 of the vehicle 110 during a turning maneuver and reduce the power output to the slipping tire 116 and or apply a braking action to one of the other tires to prevent or reduce sliding the vehicle 110 so that the vehicle 110 does not lose control of its maneuvering. The anti-lock braking control system 616 may be configured in some examples to sense a traction event including the ceasing of rotation of one of the tires 116 during vehicle braking and reduce the braking applied to that tire 116 in order to allow the tire 116 to continue rotating and regain traction. The reduction in braking may be a reduction in pressure applied to brake calipers associated with that tire 116 and/or a reduction in regenerative braking applied to that tire 116 (e.g., via drive motors). This may permit the vehicle 110 to maintain control of maneuvering during braking events.

In some examples, the friction estimation system 390 may include an events module 510 configured to update the correlation between the image data 400 and the friction-related data 411 based on correlations between the image data 400 and traction events sensed by at least one of the traction control system 612, the stability control system 614, or the anti-lock braking control system 616. For example, the traction control system 612, the stability control system 614, and/or the anti-lock braking control system 616 may sense loss of traction, as noted above, and communicate the loss of traction to the events module 510, and the events module 510 may be configured to update the correlation between the image data 400 and the friction-related data 411, as noted herein. For example, the updates to the correlation may be based on correlations between the image data 400 and sensed traction events 511 between the tires 116 of the vehicle 110 and surface 112 on which the vehicle has travelled, which may result in reducing the level of the friction-related data 411 to tailor the friction-related data 411 to actual occurrences. This may improve the accuracy of the correlations over time.

The example illustrated om FIG. 6 also includes a safety system 618 configured to protect at least one of objects outside the vehicle 110 from collisions with the vehicle 110, or occupants inside the vehicle 110 during collisions. In some examples, the vehicle control system 370 may be configured to alter operation of the safety system 618 based, at least in part, on the friction-related data 411. For example, the safety system 618 may include one or more of an interior safety system 380 and an exterior safety system 381 (see FIG. 3). One or more portions of the interior safety system 380 may be configured to enhance the safety of occupants of the vehicle 110 in the event of a collision and/or other event, such as an abrupt collision avoidance maneuver by the vehicle 110. One or more portions of the exterior safety system 381 may be configured to reduce impact force or other adverse effects of a collision. The interior safety system 380 may include systems, such as, for example, a seat actuator system 382 and a seat belt tensioning system 383. The exterior safety system 381 may include systems, such as, for example, an acoustic array system 384 and a light emitter system 385 for warning the objects (e.g., pedestrians, cyclists, and other vehicles).

In some examples, the various portions of the safety system 618 may be activated based on the projected trajectory of the vehicle 110, the projected paths of the objects surrounding the vehicle 110, and threshold distances from the vehicle 110 to the objects. The safety system 618 may be configured to activate the various portions of the safety system 618 based on the ability of the vehicle 110 to avoid a collision with the objects, and the ability to avoid the collisions may be affected by the level of traction between the tires 116 of the vehicle and surface 112 on which the vehicle travels. In some examples, operation of the safety system 618 may be altered based on the friction-related data 411 obtained from the friction estimation system 390. For example, the friction estimation system 390 may estimate a relatively reduced level of the friction-related data 411 based on image data 400 obtained for the surface 112, and the reduced level of the friction-related data 411 may be communicated to the safety system 618, either directly or via other portions of the operation control system 310. As a result, the safety system 618 may alter (e.g., increase) the threshold distances at which the different portions of the safety system 618 are activated. This may increase the likelihood of the safety system 618 activating appropriately based on the level of traction available to the tires 116.

Figure 7:
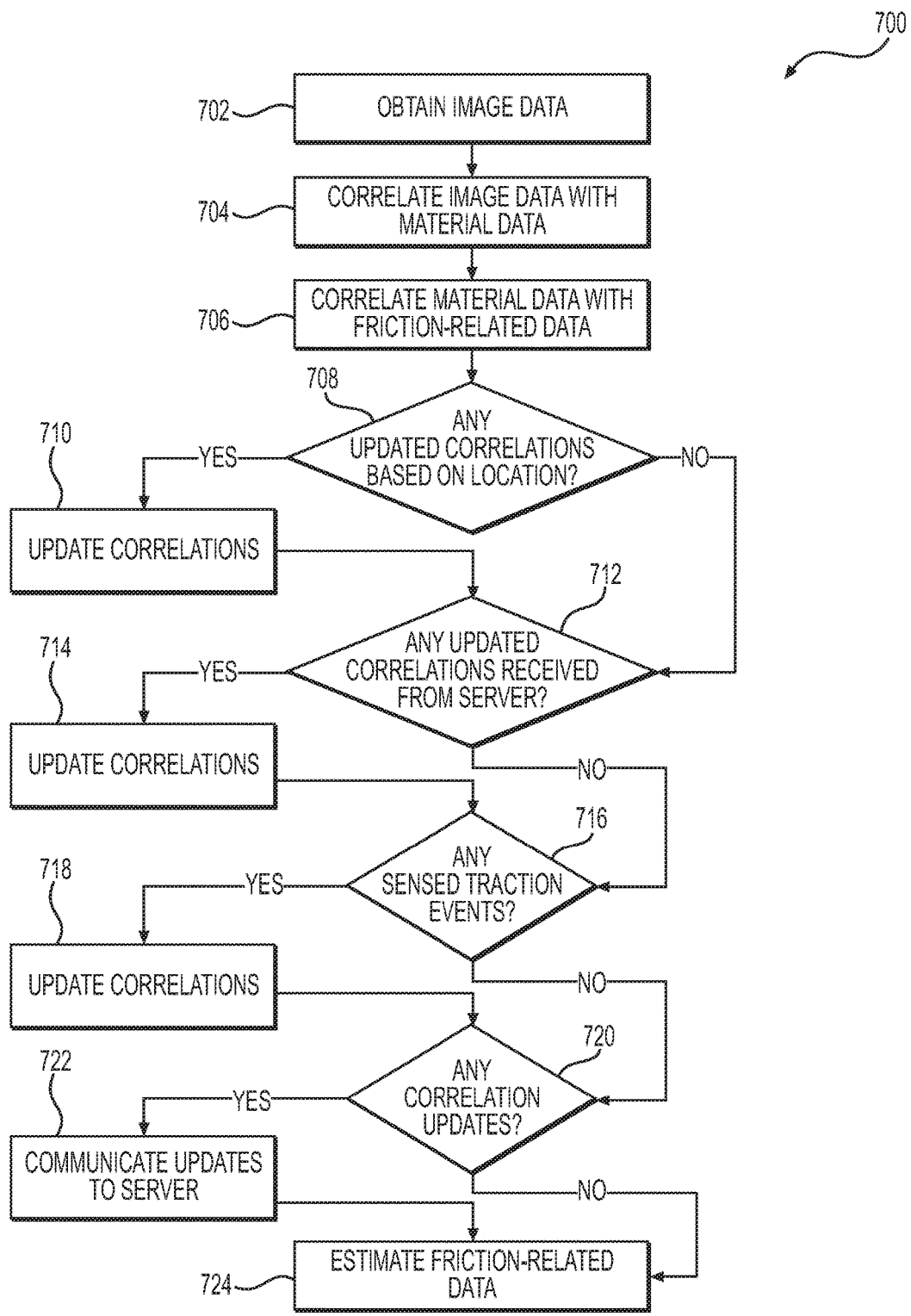
FIG. 7 is a flow diagram of an example method for estimating friction-related data associated with a surface on which a vehicle travels.
Figure 8:
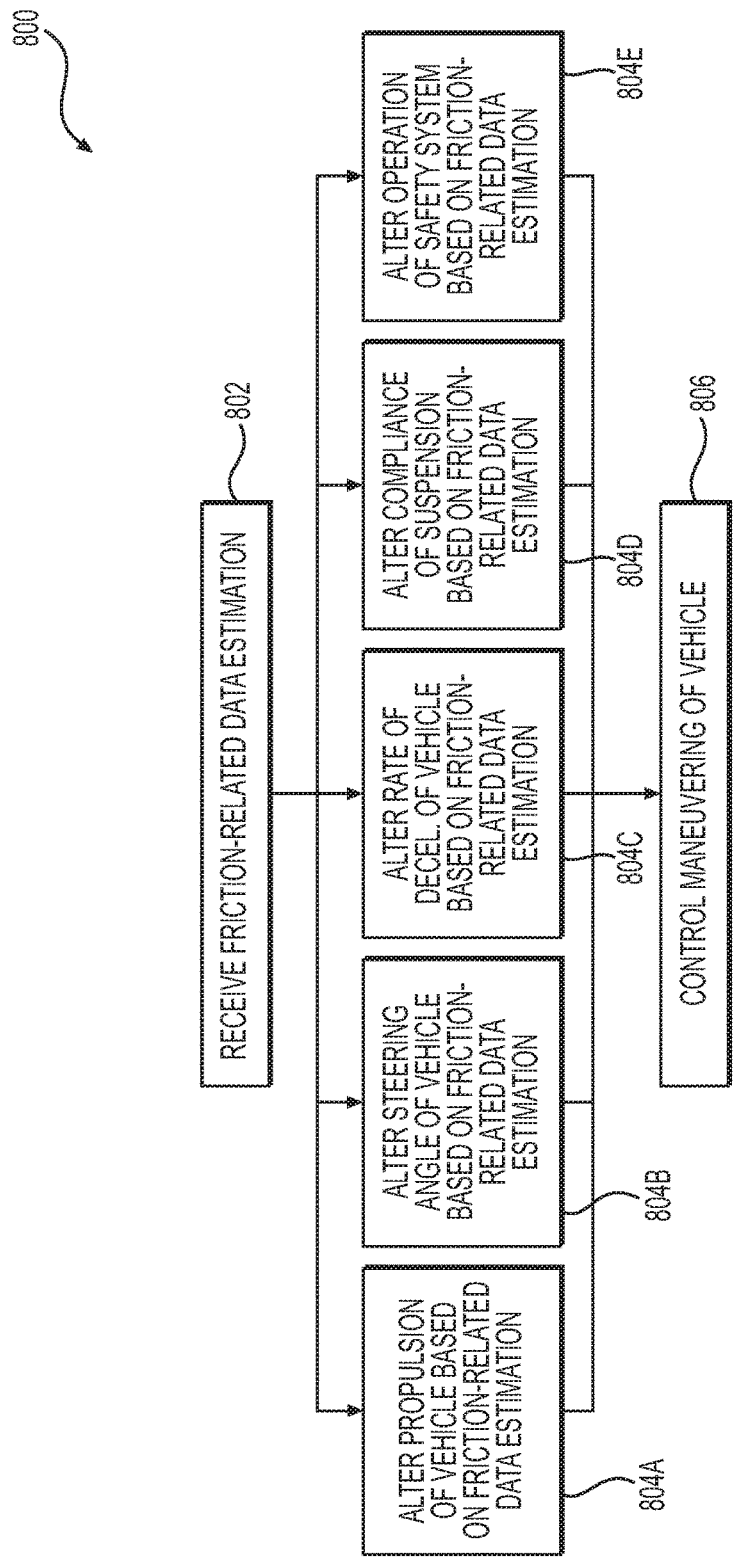
FIG. 8 is flow diagram of an example method for controlling maneuvering of a vehicle on a surface.

FIGS. 7 and 8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an illustrative method 700 for estimating friction-related data 411 associated with a surface 112 on which a vehicle 110 travels. The method 700 may be performed by the systems described above, or via alternative systems. In some examples, the method 700 may be performed in whole or in part by one or more systems of a vehicle, such as vehicle 110. In some examples, at least some of the operations of method 700 may be performed by another computing device separate and/or remote from the vehicle.

At step 702, the friction estimation system 390 may obtain image data 400 associated with the surface 112 via a camera array 134 including a plurality of imagers 136. In some examples, the image data 400 may include light data and/or texture data associated with the surface 112.

At step 704, the friction estimation system 390 may correlate the image data 400 with material data 416 associated with a material of the surface 112. For example, the friction estimation system 390 may correlate light data and/or the texture data included in the image data 400 with material data 416 associated with the surface 112. At step 706, the friction estimation system 390 may correlate the material data 416 with friction-related data 411. In some examples, the friction-related data 411 may be a friction coefficient between one or more tires 116 of the vehicle 110 and the surface 112. Other types of friction-related data 411 are contemplated, as mentioned herein. In some examples, correlating the image data 400 with the material data 416 associated with the material of the surface 112 may include obtaining the correlation from at least one of (1) a correlation module 412 including obtaining the correlation from a correlation table 415 including correlations between the image data 400, the material data 416, and the friction-related data 411, and/or (2) mathematical relationships between the image data 400, the material data 416, and/or the friction-related data 411. In some examples, this correlation may be made according to the image depth profile and machine learning techniques described previously herein.

In some examples, the method may include updating one or more of the correlations. For example, as shown in FIG. 7, the correlations between the image data 400 and the friction-related data 411 may be updated based, at least in part, on location data associated with the location of the vehicle 110. For example, the vehicle 110 may have previously travelled across the surface 112 at the current location of the vehicle 110. As the operation control system 310 of the vehicle 110 projects that the location is approaching, the friction estimation system 390 may update the correlation between the image data 400 and the friction-related data 411 based, at least in part, on the location of the vehicle. For example, the friction estimation system 390 may correlate the location and the friction-related data 411. As shown in FIG. 7, at step 708, the friction estimation system 390 may determine whether there are any updated correlations based on the location of the vehicle 110. If so, at step 710, the friction estimation system 390 may update one or more of the correlations, as described above, and thereafter proceed to step 712. If not, the method will proceed to step 712 without updating the correlations based on the location of the vehicle 110.

In some examples, the friction estimation system 390 may update one or more of the correlations based, at least in part, on updates relating to correlations between the image data 400 and the friction-related data 411 received via a network 516. For example, the network 516 may be in communication with a server 517, which in turn, may include a database of correlations obtained from the vehicles of a fleet of vehicles 110. The databased may be used to update the correlations of any of the vehicles of the fleet of vehicles via the server 517. As shown in FIG. 7, at step 712, the friction control system 390 may determine whether there are any updated correlations received from the server 517. If so, at step 714, the friction estimation system 390 may update one or more of the correlations, as described above, and thereafter proceed to step 716. If not, the method will proceed to step 716 without updating the correlations based in information received from the server 517.

In some examples, the friction estimation system 390 may update the correlation between the image data 400 and the friction-related data 411 based on correlations between the image data 400 and sensed traction events 511 between the vehicle tires 116 and the surface 112 on which the vehicle 112 has travelled. In the example shown, at step 716, the friction estimation system 708 determines whether sensed traction events 511 have occurred (e.g., one or more of the tires 116 has lost traction, for example, as described herein). If sensed traction events 511 have occurred, at step 718, the friction estimation system 390 updates one or more of the correlations to improve the accuracy of the correlations and the friction-related data 411 estimation, and thereafter proceed to step 720. If no traction events have been sensed, the method proceeds to step 720 without updating the correlations based on sensed traction events.

Some examples of the method may include communicating data correlating a location of the vehicle 110 and the friction-related data 411 to a network 516. For example, a friction estimation system 390 associated with a vehicle 110 may report updates to one or more of the correlations to a server 517 (e.g., via the network 516), so that the updates may be stored in a database. The updates store in this example manner may, in turn, be communicated to, for example, other vehicles in a fleet of the vehicles. In the example shown, at step 720, the friction estimation system 390 may determine whether any updates have been made to the correlations, and if so, at step 722, communicate the correlation updates to the server 517 and proceed to step 724. In some examples, data correlating the location of the vehicle 110 and the friction-related data 411 may be incorporated into the correlation between the image data 400 and the friction-related data 411. For example, this may be incorporated into the machine learning system described previously herein. In some examples, step 722 may include reporting data to a government-affiliated department, either directly or via the network 516, as described herein, and thereafter proceeding to step 724. If no updates have occurred, the method may proceed to step 724 without communicating with the network 516 of the server 517. In some examples, the data may be reported to other third party services, such as, for example, mapping services, weather services, and/or any other parties that might find the data useful or beneficial.

At step 724, the friction estimation system 390 may estimate the friction-related data 411 based, at least in part, on the correlation between the image data 400, the material data 416, and the friction-related data 411. For example, the friction estimation system 390 may estimate the friction-related data 411 based, at least in part, on the material data 416. In some examples, this may take into account any updates to the correlations, as described herein.

FIG. 8 is a flow diagram of an illustrative method 800 for controlling maneuvering of a vehicle 110 on a surface 112. The method 800 may be performed by the systems described above, or via alternative systems.

At step 802, the method includes receiving an estimation of friction-related data 411 associated with the surface 112 on which the vehicle 110 travels. The friction related-data 411 estimation may be performed according to any of the friction-related data 411 estimation methods described herein or otherwise known. In the example shown, controlling maneuvering of the vehicle 110 may include altering one or more of propulsion of the vehicle 110, a steering angle of the vehicle 110, a rate of deceleration of the vehicle 110, compliance of the suspension of the vehicle 110, and operation of a safety system 618 of the vehicle 110. In some examples, one or more of these alterations may be performed in parallel with one another, for example, substantially or completely simultaneously. In the example shown in FIG. 8, at steps 804A, 804B, 804C, 804D, and 804E, based, at least in part, on the friction-related data 411 estimation, the propulsion of the vehicle 110 is altered (804A), a steering angle of the vehicle 110 is altered (804B), a rate of deceleration of the vehicle 110 is altered (804C), compliance of the suspension of the vehicle 110 is altered (804D), and/or operation of a safety system 618 of the vehicle 110 is altered (804E). In some examples, one or more of these example alterations may be performed in series rather than in parallel. Following the steps 804A-804E, at step 806, maneuvering of the vehicle is controlled.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for estimating friction-related data and technologies for vehicle control have been presented herein.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A friction estimation system for estimating friction-related data associated with a surface on which a vehicle travels, the friction estimation system comprising:
   a camera array comprising a plurality of imagers configured to capture image data associated with a surface on which a vehicle travels;
   an image interpreter in communication with the camera array and configured to receive the image data from the camera array and determine friction-related data associated with the surface based, at least in part, on the image data, the image interpreter being configured to be in communication with a vehicle control system and provide the friction-related data to the vehicle control system;
   a location sensor, an output of which comprises a location of the vehicle; and
   one or more processors configured to associate, based at least in part on the location, the friction-related data with a map accessible to the vehicle.

2. The friction estimation system of claim 1, wherein the image data comprises at least one of image depth profile data associated with the surface or texture data associated with the surface.

3. The friction estimation system of claim 1, wherein the friction-related data comprises a friction coefficient between the surface and one or more tires of the vehicle.

4. The friction estimation system of claim 1, wherein the one or more processors are configured to provide a correlation between the image data and the friction-related data, and wherein the correlation between image data and friction-related data comprises at least one of a correlation table correlating image data and friction-related data, or a mathematical relationship between image data and friction-related data.

5. The friction estimation system of claim 1, wherein the one or more processors are configured to provide a correlation between the image data and the friction-related data, and wherein the one or more processors are configured to update the correlation between the image data and the friction-related data based on measured correlations between the image data and sensed traction events between the vehicle tires and surfaces on which the vehicle has travelled.

6. The friction estimation system of claim 1, wherein the one or more processors are configured to provide a correlation between the image data and the friction-related data, and wherein the correlation comprises a correlation between the image data and a material from which the surface is made, and a correlation between the material and the friction-related data.

7. The friction estimation system of claim 1, wherein the one or more processors are configured to provide a correlation between the image data and the friction-related data, and wherein the one or more processors are configured to receive the location of the vehicle and update the correlation between the image data and the friction-related data based, at least in part, on the location of the vehicle.

8. The friction estimation system of claim 1, further comprising a transmitter in communication with a network and configured to communicate data correlating the location of the vehicle and the friction-related data via the network.

9. The friction estimation system of claim 1, further comprising a receiver in communication with a network and configured to receive updates relating to a correlation between the image data and friction-related data.

10. A vehicle control system for controlling a vehicle, the vehicle control system comprising:
    a friction estimation system for estimating friction-related data associated with a surface on which a vehicle travels, the friction estimation system comprising:
       a camera array configured to capture image data associated with the surface on which the vehicle travels; and
       an image interpreter in communication with the camera array and configured to receive the image data from the camera array and to determine friction-related data associated with the surface based, at least in part, on the image data;
    a transmitter in communication with a network; and
    a drive system in communication with the friction estimation system and configured to control maneuvering of the vehicle, the drive system comprising at least one of:
       a vehicle propulsion system configured to propel the vehicle on the surface,
       a vehicle steering system configured to alter a direction of travel of the vehicle, or
       a vehicle braking system configured to reduce a speed of travel of the vehicle,
    wherein the drive system is configured to receive the friction-related data from one or more of the friction estimation system or the network and control maneuvering of the vehicle based, at least in part, on the friction-related data.

11. The vehicle control system of claim 10, wherein the image data comprises at least one of image depth profile data associated with the surface or texture data associated with the surface.

12. The vehicle control system of claim 10, wherein the friction-related data comprises a friction coefficient between the surface and one or more tires of the vehicle.

13. The vehicle control system of claim 10, wherein the drive system comprises a vehicle propulsion system configured to propel the vehicle on the surface, and wherein the drive system is configured to receive the friction-related data from the friction estimation system and alter propulsion of the vehicle based, at least in part, on the friction-related data.

14. The vehicle control system of claim 10, wherein the drive system comprises a vehicle steering system configured to alter a direction of travel of the vehicle, and wherein the drive system is configured to receive the friction-related data from the friction estimation system and alter a steering angle of the steering system based, at least in part, on the friction-related data.

15. The vehicle control system of claim 10, wherein the drive system comprises a vehicle braking system configured to reduce a speed of travel of the vehicle, and wherein the drive system is configured to receive the friction-related data from the friction estimation system and alter a rate of deceleration of the vehicle based, at least in part, on the friction-related data.

16. The vehicle control system of claim 10, wherein the drive system further comprises a ride control system configured to control compliance of suspension of the vehicle, and wherein the ride control system is configured to control the compliance based, at least in part, on at least one of the image data or friction-related data.

17. The vehicle control system of claim 10, wherein the friction estimation system further comprises one or more processors in communication with the image interpreter and configured to provide a correlation between image data and friction-related data.

18. The vehicle control system of claim 17, wherein the drive system further comprises at least one of:
 a traction control system configured to alter output of the propulsion system based, at least in part, on sensing slip between one or more tires of the vehicle and the surface;
 a stability control system configured to selectively control rotation of one or more tires of the vehicle based, at least in part, on sensing slip between one or more of the tires during turning of the vehicle; or
 an anti-lock braking control system configured to prevent one or more tires of the vehicle from ceasing rotation during braking of the vehicle,
 wherein the one or more processors are configured to:
 update the correlation between the image data and the friction-related data based on correlations between the image data and traction events sensed by at least one of the traction control system, the stability control system, or the anti-lock braking control system; and
 transmit, via the network, the updated correlation data to one or more of a second vehicle or a server.

19. The vehicle control system of claim 10, further comprising a safety system configured to protect at least one of objects outside the vehicle from collisions with the vehicle, or occupants inside the vehicle during collisions, and wherein the vehicle control system is configured to alter operation of the safety system based, at least in part, on the friction-related data.

20. A method for estimating friction-related data associated with a surface on which a vehicle travels, the method comprising:
 obtaining image data associated with the surface via a camera array comprising a plurality of imagers;
 correlating the image data with material data associated with a material of the surface;
 correlating the material data with friction-related data;
 estimating the friction-related data based, at least in part, on the correlation between the material data and the friction-related data; and
 transmitting, via a network, data correlating a location of the vehicle and the friction-related data to one or more of a second vehicle or a server.

21. The method of claim 20, wherein the image data comprises at least one of image depth profile data associated with the surface or texture data associated with the surface, and wherein the method further comprises estimating the friction-related data by at least one of analyzing the image depth profile data using machine learning procedures or analyzing the texture data using multi-channel filtering techniques.

22. The method of claim 20, wherein the friction-related data comprises a friction coefficient between the surface and one or more tires of the vehicle.

23. The method of claim 20, wherein correlating the image data with the material data associated with the material of the surface comprises obtaining the correlation from at least one of a correlation table correlating the image data and the material data, or a mathematical relationship between the image data and the material data.

24. The method of claim 20, further comprising updating the correlation between the image data and the friction-related data based on measured correlations between the image data and sensed traction events between the vehicle tires and surfaces on which the vehicle has travelled.

25. The method of claim 20, further comprising updating the correlation between the image data and the friction-related data based, at least in part, on location data associated with a location of the vehicle.

26. The method of claim 20, further comprising receiving updates relating to correlations between the image data and the friction-related data via the network.

27. The method of claim 20, further comprising:
 receiving, via the network, second friction-related data associated with a second location; and
 controlling maneuvering of the vehicle at the second location based, at least in part, on the second friction-related data, wherein controlling maneuvering of the vehicle comprises at least one of:
 altering propulsion of the vehicle based, at least in part, on the second friction-related data,
 altering a steering angle of a steering system associated with the vehicle based, at least in part, on the second friction-related data,
 altering a rate of deceleration of the vehicle based, at least in part, on the second friction-related data, or
 altering operation of a safety system based, at least in part, on the second friction-related data, wherein the safety system is configured to protect at least one of objects outside the vehicle from collisions with the vehicle, or occupants inside the vehicle during collisions.

28. The method of claim 20, further comprising updating the correlation between the image data and the friction-related data based on correlations between the image data and traction events sensed by at least one of a traction control system associated with the vehicle, a stability control system associated with the vehicle, or an anti-lock braking control system associated with the vehicle.

* * * * *